US008744674B2

United States Patent
Zimmermann et al.

(10) Patent No.: US 8,744,674 B2
(45) Date of Patent: Jun. 3, 2014

(54) METHOD FOR CONFIGURING INFOTAINMENT APPLICATIONS IN A MOTOR VEHICLE

(75) Inventors: Sebastian Zimmermann, Munich (DE); Mikhail Smirnov, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/368,910

(22) Filed: Feb. 8, 2012

(65) Prior Publication Data

US 2012/0143404 A1    Jun. 7, 2012

Related U.S. Application Data

(63) Continuation of application No. PCT/EP2010/004638, filed on Jul. 29, 2010.

(30) Foreign Application Priority Data

Aug. 19, 2009 (DE) .......................... 10 2009 038 035

(51) Int. Cl.
*G06F 17/00* (2006.01)

(52) U.S. Cl.
USPC ............ 701/36; 701/33.1; 701/115; 709/229; 709/201; 713/150; 713/156; 307/10.1; 307/10.2; 711/100; 711/106

(58) Field of Classification Search
CPC ..... G06F 3/0601; G06F 3/062; G06F 3/0622; G06F 3/0629; G06F 3/0631; G06F 3/0637; H04L 9/00; H04L 63/00
USPC .................. 701/1, 2, 115, 48, 33.1, 29.1, 36; 709/229, 201; 713/156; 307/10.1, 10.2; 365/185.29, 185.3; 711/100, 106
See application file for complete search history.

(56) References Cited

U.S. PATENT DOCUMENTS 6,249,731 B1 *   6/2001 Miller et al. ..................... 701/48
7,068,147 B2 *   6/2006 Suganuma et al. .......... 340/5.74
(Continued)

FOREIGN PATENT DOCUMENTS

DE       100 44 917 A1    3/2002
WO      WO 02/17184 A1    2/2002
WO   WO 2004092857 A2 * 10/2004

OTHER PUBLICATIONS

International Search Report dated Feb. 22, 2011 with English translation (six (6) pages).

(Continued)

*Primary Examiner* — Thomas Black
*Assistant Examiner* — Sara Nelson
(74) *Attorney, Agent, or Firm* — Crowell & Moring LLP

(57) ABSTRACT

A method of configuring infotainment applications in a motor vehicle is provided. A control unit is configurable via a configuration interface such that the functional scope and/or a basic setting of the infotainment application is changed based on first configuration data from a first configuration data server. A service center stationarily arranged at a distance from the motor vehicle has a second configuration data server and a second configuration data bank. The service center has a first modification interface by which configuration data of the second configuration data bank is modifiable using first access rights and a second Internet-based modification interface by which the configuration data is modifiable using second access rights differing from the first. Modifications of the configuration data are recognized and the configuration data of the first configuration data bank is changed by using the configuration data from the second configuration data bank.

13 Claims, 1 Drawing Sheet

(56) References Cited

U.S. PATENT DOCUMENTS

| | | | |
|---|---|---|---|
| 7,092,803 B2 * | 8/2006 | Kapolka et al. | 701/29.3 |
| 7,114,175 B2 * | 9/2006 | Lahteenmaki | 726/4 |
| 7,155,321 B2 * | 12/2006 | Bromley et al. | 701/29.6 |
| 7,502,794 B2 * | 3/2009 | Pelz et al. | 1/1 |
| 7,506,309 B2 * | 3/2009 | Schaefer | 717/120 |
| 7,532,963 B1 * | 5/2009 | Lowrey et al. | 701/29.3 |
| 7,908,224 B2 * | 3/2011 | Malcolm | 705/75 |
| 8,219,451 B2 * | 7/2012 | Kreidler et al. | 705/26.1 |
| 8,497,769 B2 * | 7/2013 | Rennie et al. | 340/426.16 |
| 2002/0082893 A1 * | 6/2002 | Barts et al. | 705/8 |
| 2003/0097211 A1 * | 5/2003 | Carroll et al. | 701/33 |
| 2003/0182233 A1 * | 9/2003 | Mocek et al. | 705/51 |
| 2004/0255037 A1 * | 12/2004 | Corvari et al. | 709/229 |
| 2006/0036356 A1 * | 2/2006 | Rasin et al. | 701/1 |
| 2007/0021844 A1 | 1/2007 | Kuhls et al. | |
| 2007/0226488 A1 * | 9/2007 | Lin et al. | 713/156 |
| 2008/0109237 A1 * | 5/2008 | Suess et al. | 705/1 |
| 2008/0120204 A1 * | 5/2008 | Conner et al. | 705/28 |
| 2008/0147245 A1 | 6/2008 | Koepf et al. | |
| 2008/0155258 A1 * | 6/2008 | Obereiner et al. | 713/168 |
| 2009/0048978 A1 * | 2/2009 | Ginter et al. | 705/51 |
| 2009/0086965 A1 * | 4/2009 | Glendinning | 380/44 |
| 2009/0164473 A1 * | 6/2009 | Bauer | 707/10 |
| 2009/0295537 A1 * | 12/2009 | Lane et al. | 340/5.82 |
| 2010/0228405 A1 * | 9/2010 | Morgal et al. | 701/2 |

OTHER PUBLICATIONS

International Preliminary Report on Patentability dated Feb. 21, 2012 (Eight (8) pages).

* cited by examiner

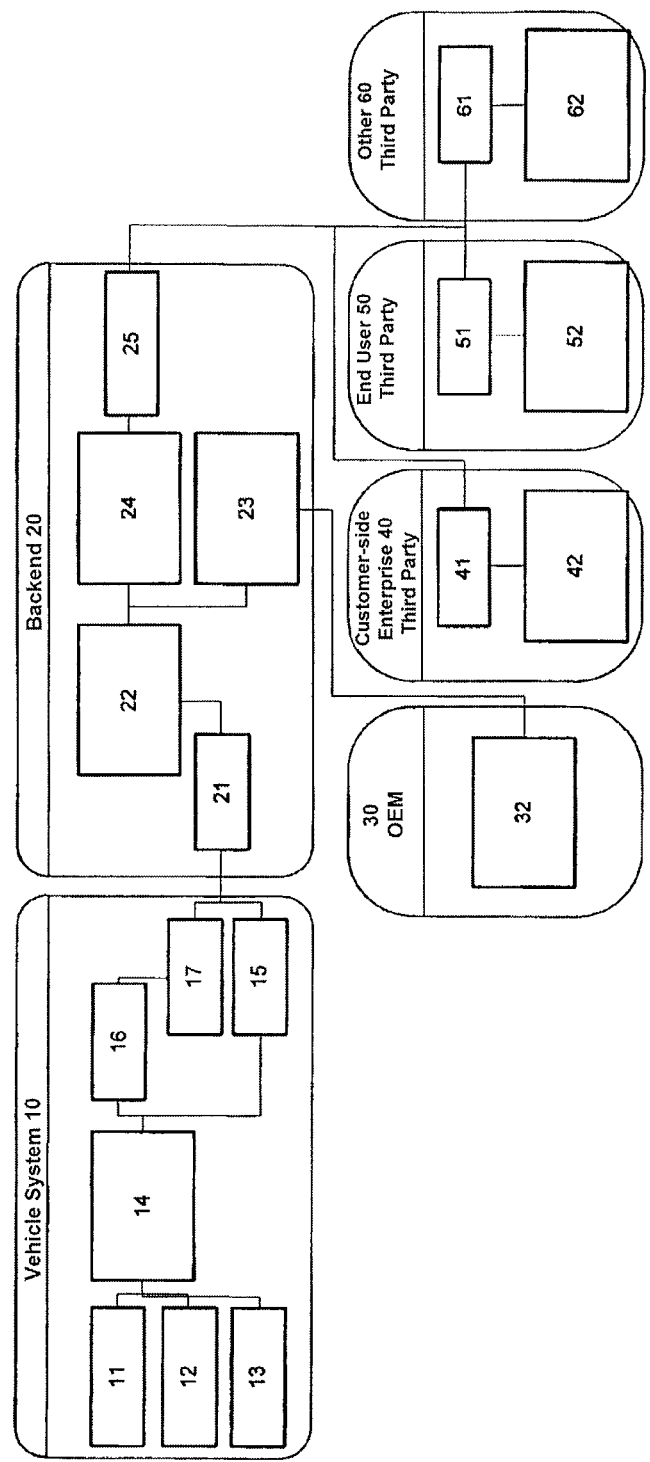

METHOD FOR CONFIGURING INFOTAINMENT APPLICATIONS IN A MOTOR VEHICLE

CROSS-REFERENCE TO RELATED APPLICATIONS

This application is a continuation of PCT International Application No. PCT/EP2010/004638, filed Jul. 29, 2010, which claims priority under 35 U.S.C. §119 from German Patent Application No. DE 10 2009 038 035.3, filed Aug. 19, 2009, the entire disclosures of which are herein expressly incorporated by reference.

BACKGROUND AND SUMMARY OF THE INVENTION

The invention relates to a method of configuring infotainment applications in a motor vehicle.

From German Patent document DE 100 44 917 A1, a method is known for utilizing functions and performance characteristics in a motor vehicle, wherein the vehicle is constructed with respect to the hardware for utilizing all functions with maximal performance characteristics, wherein, with respect to the software, functions can be blocked and/or performance characteristics can be limited, whereby a user of a motor vehicle can temporarily or durably request functions or performance characteristics which will then be temporarily or durably cleared with respect to the software.

From WO 02/17184 A1, a "Total Fleet Logistics" system is known. This system permits the implementation of a vehicle diagnosis, a vehicle monitoring, a vehicle configuration and a vehicle programming, for example, by a fleet operator via the Internet.

However, no satisfactory solutions for the configuration of infotainment applications in motor vehicles of a multi-vehicle fleet arrangement are known from the state of the art. As a rule, the methods known for this purpose are limited to written instructions of the fleet operator to the users of the individual fleet vehicles.

It is an object of the invention to provide an improved method for the configuration of infotainment applications in the motor vehicles of a vehicle fleet.

This and other objects are achieved by a method of configuring infotainment applications in a motor vehicle, comprising the steps of (a) providing a motor vehicle having at least one infotainment application and having a control unit which participates in the at least one infotainment application, (b) providing a configuration interface of the control unit, by way of which the control unit can be configured such that the functional scope and/or a basic setting of the infotainment application is changed, (c) providing a first configuration data server, which is arranged at the motor vehicle, is separate from the control unit with respect to equipment and has a pertaining first configuration data bank for the vehicle-related storage of configuration data, (d) providing a service center stationarily arranged at a distance from the motor vehicle and having a second configuration data server arranged there and a second configuration data bank for the central storage of configuration data, (e) providing a wireless communication connection between the first and the second configuration data server, (f) providing a first modification interface by way of which configuration data of the second configuration data bank can be modified by means of first access rights, (g) providing a second Internet-based modification interface by way of which configuration data of the second configuration data bank can be modified by means of second access rights which differ from the first access rights, (h) recognizing modifications of the configuration data of the second configuration data bank, (i) changing of configuration data of the first configuration data bank by way of the wireless communication connection by use of configuration data from the second configuration data bank, and (j) changing the functional scope and/or a basic setting of the infotainment application by way of the configuration interface of the control unit by use of configuration data from the first configuration data bank.

On the part of the motor vehicle, the basis is a motor vehicle having at least one infotainment application and having a control unit which participates in the at least one infotainment application. In connection with a motor vehicle, the term "infotainment" should be understood as covering the areas of information, communication and entertainment. An infotainment application of a motor vehicle therefore represents applications in connection with navigation, telephone, telematics, radio, audio, video, email, Internet, as well as future further developments, supplements to and/or substitutions for such applications.

The control unit participating in the at least one infotainment application has a configuration interface by way of which it can be configured such that the functional scope and/or a basic setting of the infotainment application is changed. A change of the functional scope of the infotainment application may consist, for example, of the clearing of a navigation function, of the clearing of an Intranet service or of the clearing of a TV function also when the motor vehicle is being driven. A change of a basic setting of the infotainment application may consist, for example, of defining a home address for a navigation system, of parameterizing an email account or of configuring an intranet access.

Furthermore, on the part of the motor vehicle, a first configuration data server which, relative to the equipment, is separate from the control unit, is provided which has a pertaining first configuration data bank for the vehicle-related storage of configuration data.

At a distance from the motor vehicle, a second configuration data server is provided in a stationary manner at a service center and has a pertaining second configuration data bank for the central storage of configuration data. A wireless communication connection exists between the first and the second configuration data server.

The service center can be operated, for example, by a vehicle manufacturer or OEM (original equipment manufacturer) and/or may be spatially arranged at this vehicle manufacturer or OEM.

The configuration data of the second configuration data bank can be configured by way of at least two different modification interfaces. A significant difference between the at least two modification interfaces consists of the access rights which are granted to a party accessing the second configuration data bank by way of the respective modification interface during the access. By way of a first modification interface, the configuration data of the second configuration data bank can be modified by using first access rights; by way of a second modification interface, the configuration data of the second configuration data bank can be modified by using second access rights which differ from the first access rights.

The first modification interface is preferably implemented in a manner not based on the Internet. It is preferably implemented in a hard-wired manner, and preferably access can only take place to the second configuration data bank by a very specific arithmetic and logic unit and/or by a limited number of arithmetic and logic units, for example, by all arithmetic and logic units in a local hard-wired network, by way of the first modification interface. As an alternative or in addition, the first modification interface is preferably only accessible if corresponding first access data are available and utilized. The first modification interface is therefore particularly suitable for modifications of the second configuration data bank by a vehicle manufacturer or OEM.

For reasons of completeness, it should be noted that the first modification interface, in principle, may also be implemented on an Internet-based manner—even if it is mainly provided for modifications of the second configuration data bank by a vehicle manufacturer or OEM and if the service center is spatially arranged at the vehicle manufacturer's or OEM.

The second modification interface is implemented based on the Internet. It is preferably implemented on the basis of web technologies and/or client/server technologies known per se. According to a preferred embodiment of the invention, when corresponding second access data are available, a conventional PC connected with the Internet can access the second modification interface. The second modification interface is particularly suitable for modifications of the second configuration data bank by a fleet operator.

The first access rights and the second access rights can be defined in a disjunct fashion, i.e. such that a party accessing by way of the first modification interface can have access that differs completely from that of a party accessing by way of the second modification interface. However, there may also be a certain amount of intersecting or a certain overlapping of the access rights.

According to a preferred embodiment of the invention, in addition, a third (also Internet-based) modification interface of the second configuration data bank is provided by way of which configuration data of the second configuration data bank can be modified by means of access rights which again differ from the first and second access rights. The third modification interface is therefore suitable for modifications of the second configuration data bank by the user of fleet vehicles and/or service providers and/or application providers. However, such a modification interface may also be reserved for one of the above-mentioned user groups, while the other user groups are provided with their own Internet-based modification interfaces with their own access rights. The third modification interface and possibly additional modification interfaces are also preferably secured by corresponding access data.

Possible modifications of the configuration data of the second configuration data bank are recognized either on the part of the service center and/or on the part of the motor vehicle communicating with the service center. It is, for example, possible to implement a recognition of modifications of the configuration data of the second configuration data bank such that, after an access by way of one of the modification interfaces, the configuration data are considered to be changed. However, it may, for example, also be checked whether actually changing accesses have been carried out and/or the data status can be compared with an earlier data status with respect to changes.

Regularly (for example, cyclically), at defined points-in-time and/or upon the recognition of a change of the data status of the configuration data of the second configuration data bank (i.e. to an extent "in response" to the recognition), configuration data of the first configuration bank are changed by way of the wireless communication connection between the first and the second configuration data server. This takes place by use of configuration data from the second configuration data bank, preferably only by use of previously changed configuration data from the second configuration bank. Correspondingly, preferably not all, but only selected, configuration data of the first configuration data bank are changed, particularly those configuration data of the first configuration data bank which have a content-related connection with previously changed configuration data of the second configuration data bank.

By means of the thus changed configuration data from the first configuration data bank, by way of the configuration interface of the control unit, finally the functional scope and/or a basic setting of the infotainment application is changed. This can also take place either regularly (for example, cyclically) at defined points-in-time and/or upon the recognition of a change of the data status of the configuration data of the first configuration data bank (i.e. to an extent, "in response" to the recognition).

Preferably, a basic setting of the infotainment application is changed, and the basic setting is a basic setting relating to the administration of personal information management data. Correspondingly, the infotainment application preferably is an application which, —at least among other things—administers personal information management data, such as an email client.

The term "personal information management data", which, in the meantime, has become established in technical circles, in this case, relates to electronically existing personal data, such as contacts, schedules, notes, documents, such as letters, faxes, SMS's, emails, RSS feeds as well as current correspondence, future further developments, supplements to and/or substitutions for such data.

In the described manner, such changes of the functional scope and/or basic setting of the infotainment application are preferably carried out which cannot be made by operating devices available in the motor vehicle, particularly not the "conventional operating devices" (push buttons, touchpad, keyboard, pressure/rotary controls, etc.) of the motor vehicle.

If required, implemented definitions of the functional scope and/or of the basic setting can, however, be indicated by means of operating devices available in the motor vehicle. If, for example, an email client is configured in the above-described manner, the settings (email server, account name, . . . ) for a vehicle occupant can be represented on a display unit but cannot be changed.

According to a preferred embodiment of the invention, by way of the wireless communication connection between the motor vehicle and the service center, data, particularly so-called certificate signing requests or other configuration-relevant and authentication-relevant data can be stored or are stored at the second configuration data service by the first configuration data server.

Such certificate signing requests with respect to a locally generated secret code are preferably previously stored by a control unit at "its" configuration interface, i.e. at the configuration interface assigned to it, and or at the configuration data server.

In certain cases, the secret access code is generated in the vehicle and never leaves the vehicle. The vehicle generates a "certificate signing request" which contains the pertaining public code. This certificate signing request has to be signed by the "certificate authority" relevant with respect to a certain access authorization and has to be transmitted as a certificate back into the vehicle. By means of this certificate and the secret code, the vehicle application then obtains access to, for example, the business data.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a view of an example of the architecture of a system for implementing the method according to the invention.

DETAILED DESCRIPTION OF THE DRAWING

According to the state of the art, functions in the field of information, communication and entertainment (overall term: infotainment) are generally unlimited and can be configured exclusively by the respective end user. One of a few exceptions is a blocking of certain functions by the vehicle manufacturer, for example, in that the end user first has to enter a clearing code before he can use the respective function.

A configuration of infotainment applications is known, for example, in that the end user is provided with the possibility of configuring an email client or an access to an email server by way of operating devices in the vehicle or from a distance by way of an online portal.

A satisfactory central management for the configuration of infotainment systems, for example, by a party responsible for a motor vehicle fleet, is not possible by way of the known devices and methods. Also, so far, functions of the infotainment systems in the vehicle can, as a rule, not be limited by third parties. Currently, relevant configuration parameters, as a rule, can be changed only either by way of a coding, clearing or provisioning of the vehicle. Currently, such processes can, as a rule, be used only by the vehicle manufacturer and, in addition, with respect to the vehicle configuration, are extremely dependent on the respective market or country.

The state of the art or the above-mentioned methods and devices lead to the following disadvantageous aspects.

A first aspect 1 concerns the configuration by the customer or end user. The end user is confronted by the task of correctly configuring the infotainment systems. This results in the fact that a "correct" or uniform configuration with respect to all vehicles of a vehicle fleet can hardly, or not at all, be ensured. It is an additional fact that, if necessary, access to company resources, for example, in the case of company cars and motor vehicle fleets of the company, also is to take place by way of the vehicle. In this case, the vehicle or a backend, as required, operated by the vehicle manufacturer basically acts as an independent device and is therefore not part of the IT infrastructure of the customer-side enterprise (using the vehicle fleet). In order to ensure a functioning configuration in all vehicles or in as many vehicles of the vehicle fleet as possible, the IT management of the customer-side enterprise therefore has to direct all end users (for example, employees of the customer-side enterprise) into the correct configuration. In this case, if necessary, also secrets (such as user identifications, passwords, secret codes and certificates) have to be exchanged, which could also be misused.

According to the state of the art, the customer-side enterprise therefore loses control over such secrets. Furthermore, the customer-side enterprise has no control over the configuration of the used IT systems in the vehicle and in the backend. With the increasing spread and expansion of so-called personal information management (PIM) functionalities in the infotainment systems of modern motor vehicles, person-related data are increasingly processed which, as a rule, are confidential. If these PIM data relate to the enterprise, for example, business email or schedules, a processing in devices outside the enterprise is, as a rule, not permitted. As a result, the paradox situation may arise that, although the vehicle infotainment systems provide technically perfect PIM functions, the end user is finally not allowed to use them because of the lack of control by the customer-side enterprise.

A second aspect 2 concerns the possibility of limiting functions (which is often absent according to the state of the art). With respect to information-related systems in enterprises (and outside of motor vehicles), it is currently customary for the IT management of the enterprise to set preconditions with respect to the use and configuration of these devices, and to also technically enforce these preconditions in the form of security guidelines and policies.

So far, there have not been any satisfactory possibilities of finding a corresponding solution in the case of vehicle infotainment systems. Thus, a customer-side enterprise or vehicle lessor can set no limitations and preconditions with respect to the configuration and the use of information, communication and entertainment functions of the vehicle.

It is true that in the meantime customer-side enterprises frequently have set preconditions for fleet vehicles and demanded restrictions in the functions, for example, as to which functions may be operated during the drive. However, currently, the vehicle manufacturer can react in this respect only at relatively high expenditures, specifically in that the latter either establishes a restriction individually for individual or all vehicles which are supplied to the respective customer-side enterprise, or a corresponding limitation is even incurred for all customers. In contrast, it would be significantly more advantageous if, instead, a party responsible for the vehicle fleet or the IT management of the customer-side enterprise itself could configure limitations in the vehicle.

Even business models could be linked to a corresponding configurability. Currently, car rental firms cannot separately account for additional functions, such as the use of a navigation system. The customer is therefore either offered a vehicle with or without a navigation system. On the basis of the introduced method, a navigation application could be cleared by the car rental firm on demand.

A third aspect 3 concerns a policy-based software sale of or a software leasing of vehicle functions. Because of the very limited possibilities according to the state of the art of activating or deactivating software-based vehicle functions, it is currently, as a rule, not possible to make a certain function or application available to an end user for only a limited time. On the basis of the introduced method, it would be possible to rent (from the customer's viewpoint) or clear (from the viewpoint of the customer-side enterprise and/or from the vehicle manufacturer's viewpoint) a navigation application, for example, for the period of a vacation trip or business trip.

The introduced method permits a central configuration of the information, communication and entertainment systems of the motor vehicle that can be carried out from a distance, for example, by the IT management of an enterprise, by a service provider, by an operator of a vehicle fleet, by a car rental agency or by a vehicle manufacturer or their dealer network. The end user of the vehicle will not be burdened with this task.

The introduced method further permits a limitation of the functionality or configuration settings in the information, communication and entertainment systems in the vehicle by the use of guidelines and policies by an authorized entity, for example, the IT management of an enterprise, by a service provider, by a fleet operator, by a rental car agency or by a vehicle manufacturer. A car rental agency and/or a vehicle manufacturer can therefore provide certain functions for a surcharge or otherwise limit them.

On the basis of the introduced method, customer-side enterprises are permitted to treat information, communication and entertainment systems of the motor vehicle as part of the IT infrastructure of the customer-side enterprise. The access to confidential firm resources, such as the email server, the intranet, the appointment schedule, the VPN, etc. can thereby be configured and limited by the enterprise itself.

A preferred technical system or architecture for implementing the invention is schematically constructed as follows in FIG. 1.

In the on-board power supply system of the motor vehicle 10, at least one electronic control unit, if necessary, also several electronic control units (in FIG. 1, precisely three control units), is equipped with a "configuration and policy client" 11, 12, 13, by way of which the functions provided by the respective control unit are configured or limited. Thus, for example, the navigation can be set such that a destination input is possible only when the vehicle is standing still or the email application can be configured correctly.

The "configuration and policy client" receives the configuration data and guideline policies from an "in-vehicle configuration and policy server and database" 14, which is central in the vehicle, is implemented in an electronic control unit in the vehicle, and in which all configurations and guidelines/policies are centrally provided.

According to an optional but preferred definition of the introduced method, one or more control units in the on-board supply system of the motor vehicle 10 can store a "certificate signing request" for a locally generated secret code in the "configuration and policy client" 11, 12, 13. The following use case can therefore be implemented on the basis of the infrastructure illustrated in FIG. 1. The secret code is generated in the vehicle. For this purpose, a certificate signing request is generated which has to be transmitted to a certificate authority (CA) situated outside the vehicle—this may especially be the vehicle manufacturer's CA—, has to be signed there and subsequently has to be transmitted as a signed certificate back into the vehicle.

The "configuration and policy client" 11, 12, 13 regularly updates the relevant configuration and policy data from this "in-vehicle configuration and policy server and database" 14. Conversely, when updating the data in the "in-vehicle configuration and policy server and database" 14, a notification of the clients 11, 12, 13 concerning the change can also take place. This can be called a "configuration and policy push".

According to a further optional but preferred definition of the introduced method, the "configuration and policy client" 11, 12, 13 can store information in the "in-vehicle configuration and policy server and database" 14, for example, "certificate signing requests" or other configuration, and authentication, relevant data.

By way of current cryptographic methods, it is optionally ensured that the configuration and guideline data are confidential, authentic and/or free of manipulation.

By way of a communications device (for example, a GSM-, GPRS-, UMTS-, Wimax-, WLAN- or LTE-module) 15 built into the vehicle or by way of a consumer electronics (CE) device (or portable communications device) 17 introduced by the end user (and connected by way of a corresponding interface "CE device interface" 16), the "in-vehicle configuration and policy server and database" 14 communicates with the backend—the "configuration and policy backend" 20. The core component of the backend 20 is the "backend configuration and policy server and database" 22, in which all relevant configuration and guideline data are stored. The communication takes place by way of a wireless communication connection between the communications device 15 or the CE device 17 and a communications device 21 connected with the "backend configuration and policy server and database" 22.

In contrast to the vehicle system 10, the backend 20 is always available and can service several vehicles. The configuration and policy data are centrally situated in the "backend configuration and policy server and database" 22 and are retrieved in regular cycles by the in-vehicle configuration and policy server and database" 14 in that changes are transmitted into the vehicle 10.

According to a further optional but preferred definition of the introduced method, the in-vehicle configuration and policy server and database" 14 can update or add data possibly (see above) stored there, such as "certificate signing requests" or other configuration, and authentication, relevant data, in the "backend configuration and policy server and database" 22.

By way of current cryptographic methods, it is optionally ensured that the configuration and guideline data are confidential, authentic and/or free of manipulation.

The data stored in the "backend configuration and policy server and database" 22 may include, among others:

(a) Settings, for example, configuration of email accounts, user information, such as email addresses, favorites, bookmarks, navigation destinations, video screen backgrounds, personalizations, sender lists, news channels, etc.

(b) Authentication data, such as user names and passwords, secret codes, certificates (for example, for certificate-based authentication, for example, when retrieving company email), etc.

(c) "Certificate signing requests", which were generated by users of the on-board power supply system of the motor vehicle and have to be transmitted to a certificate authority (CA) of the vehicle manufacturer and/or of an authorized third party.

(d) Guidelines and policies, such a limitations of certain functions in certain situations, limitations with respect to parameters, for example, speed or location or time or frequency of use, limitations with respect to communication partners, limitations of import/export interfaces, preconditions with respect to password quality, frequency of change of the password for access to information (for example, company emails), preconditions with respect to the auto-erasing of data memories in the vehicle after an incorrect password input, etc., preconditions with respect to a linkage to a certain vehicle code, etc.

(e) Authorizations, such as clearing of vehicle codes for a vehicle, or replacing the function of the vehicle code by other access codes, such as user name and password.

(f) Commands to be executed by the vehicle for the protection of the IT infrastructure of the enterprise when misuse is to be assumed, for example, after a vehicle was stolen, such as the erasing of the data stored in the vehicle, for example, emails, telephone books, etc. and access authorizations/secrets.

The data stored in the "backend configuration and policy server and database" 22 can be processed by the vehicle manufacturer 30 and/or by an authorized third party 40, 50, 60 by way of a "policy configuration user interface" 23, 24.

For access by the vehicle manufacturer 30, a separate first "policy configuration user interface" 23 can be provided for policies which can be configured especially by the vehicle manufacturer ("vendor configurable policies"). In the present case, the interface 23 is not implemented based on the Internet. In particular, access can be based on web or client/server technologies. For this purpose, a "policy configuration user interface client" 32 is implement on the part of the vehicle manufacturer.

For the, preferably Internet-based, access of authorized third parties, a separate second "policy configuration user interface" 24 can be provided for policies which can be configured especially by authorized third parties 40, 50, 60, particularly end customers (user configurable policies"). In this case, web or client/server technologies can be used. In the case of every authorized third party 40, 50, 60, a "policy configuration user interface client" 42, 52, 62 is implemented for this purpose. For the data connection between the backend 20 and the authorized third party 40, 50, 60, a communication device 25 is provided at the backend 20, on the one hand, and a communication device 41, 51, 61 is provided at each authorized third party 40, 50, 60, on the other hand. Current authentication and coding techniques can be used for the access.

In particular, an authorized third party may be a customer-side enterprise 40, especially its fleet management or IT management, and/or a car rental agency.

Authorized third parties may also be end users 50. End users may, in turn, either themselves be vehicle owners (and are therefore not subject to any instructions or policies of a customer-side enterprise), or they are renters of a rental car or personnel of a customer-side enterprise (who are subject to instructions or policies of a customer-side enterprise).

Furthermore, authorized third parties may be other so-called "3rd parties" 60, for example, service providers or application providers.

Although, in the present example, the access of the different groups 40, 50, 60 of authorized third parties is based on the same technology and comparable hardware, preferably different access rights are granted to the different groups 40, 50, 60 of authorized third parties.

Finally, the significant advantages of the introduced method are summarized and explained using examples of application scenarios.

The method according to the invention makes it possible for an enterprise to maintain control of the information, communication and entertainment functions of the vehicle. In the case of the method according to the state of the art, the control is, as a rule, completely subject to the vehicle user. This control is a prerequisite for the fact that the vehicle can be integrated in the infrastructure of the enterprise, for example, by access to emails, schedules or the intranet. Furthermore, the inventive method makes it possible to allow a technical department to centrally carry out the "correct" configuration for a plurality of vehicles so that, in the course of a growing complexity, each end user will no longer have to deal completely with all functions and their correct configuration.

The inventive method supports, among others, the following selected application cases or application scenarios chosen as examples.

A first application scenario relates to the configuration of functions by the fleet manager or the IT management of a customer-side enterprise. The introduced method makes it possible to centrally, i.e. company-wide, configure the infotainment functions in the vehicle by a fleet management or the IT management. As a result, a uniform configuration is ensured for all vehicles of the vehicle fleet. If required, the manager can also block the configuration with respect to changes.

A second application scenario relates to the configuration by a service provider. The introduced method makes it possible that a third party service provider can establish a configuration which the end user can then activate in the vehicle. Thus, an email provider (for example, GOOGLE MAIL) could offer a function by way of which the vehicle is automatically configured such that the email can also be retrieved in the vehicle. The vehicle user can then simply import the correct configuration into his vehicle.

A third application scenario relates to the blockage of individual functions. A customer-side enterprise or a car rental firm can block functions in the infotainment domain for its own vehicles. Thus, for example, the maximal volume of the music can be limited; the destination input during the drive can be prevented, or a navigation into a foreign country can be prevented. By way of guidelines and policies, the functions can be limited individually. The car rental agency can therefore individually clear, for example, the navigation or the television, depending on which rate the car rental customer has booked. Analogously, this possibility also exists for the vehicle manufacturer (for example, clearing of the navigation for a certain time period).

A fourth application scenario relates to the use of security guidelines. Since the infotainment system of the vehicle can be utilized for business information, for example, email or the address book, and this information is normally subject to security guidelines of the enterprise, it may be useful to technically implement these security guidelines also in the vehicle. The introduced method makes this possible, for example, in that certain functions, such as data exports, are blocked, or in that preconditions are set for the use, for example, in the form of password protection of sufficient quality or the linkage to a certain vehicle code. As required, for example, all data stored in the vehicle can be automatically erased when a security guideline is violated. The security guidelines may, for example, also include the limitation of websites which the end user is permitted to retrieve.

A fifth application scenario relates to a so-called "configuration roaming". Furthermore, the introduced method makes it possible not to link the configuration to a certain vehicle but to a certain vehicle code or a certain person who has identified himself by a user name/password, by way of a CE device or by other authentication devices. Thus, an individual configuration could, for example, always follow the end user into the vehicle he is presently using.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of configuring infotainment applications in a motor vehicle equipped with a control unit operatively configured for at least one infotainment application, a configuration interface by which the control unit is configurable to change at least one of a functional scope and basic setting of the infotainment application, and a first configuration data server separate from the control unit and having a pertaining first configuration data bank for vehicle-related storage of configuration data, wherein the motor vehicle is communicable with a second configuration data server arranged at a service center remote from the vehicle and having a second configuration data bank for central storage of configuration data, as well as a first modification interface by which configuration data of the second configuration data bank is modifiable using first access rights and a second Internet-based modification interface by which configuration data of the second configuration data bank is modifiable using second access rights differing from said first access rights, and wherein the service center is operated by an original equipment manufacturer (OEM), and further wherein the first modification interface is used for modifications by only the OEM having the first access rights and the second modification interface is used for modification by only at least one non-OEM having the second access rights, the method comprising the acts of:
recognizing modifications of the configuration data of the second configuration data bank that occur via use of one of the first and second access rights;
transmitting a change of configuration data for the first configuration data bank by use of configuration data from the second configuration data bank, wherein the transmitted change of configuration data effects a change in the at least one of the functional scope and the basic setting of the infotainment application by way of the configuration interface of the control unit by use of configuration data from the first configuration data bank.

2. The method according to claim 1, wherein the change in the basic setting of the infotainment application relates to a change of administration of personal information management data.

3. The method according to claim 1, wherein the change in the at least one of the functional scope the basic setting is not possible using only operating devices available in the motor vehicle.

4. The method according to claim 1, wherein the service center comprises a third Internet-based modification interface by which configuration data of the second configuration data bank is modifiable via third access rights differing from the first and second access rights.

5. The method according to claim 1, wherein the change of configuration data for the first configuration data bank occurs in response to recognizing modifications of the configuration data of the second configuration data bank.

6. The method according to claim 1, wherein the change in the at least one of the functional scope the basic setting of the infotainment application occurs in response to a change of the configuration data of the first configuration data bank.

7. The method according to claim 1, wherein, in a case of the change of the configuration data of the first configuration data bank upon recognizing modifications of the configuration data of the second configuration data bank, only selected configuration data of the first configuration data bank are changed.

8. The method according to claim 1, wherein the first modification interface is not an Internet-based modification interface.

9. The method according to claim 1, wherein the infotainment application is an email client, and further wherein the change in the at least one of the functional scope the basic setting comprises a configuration of the email client.

10. The method according to claim 1, wherein the second configuration data server stores certificate signing requests or other configuration or authentication relevant data at a direction from the first configuration data server.

11. The method according to claim 10, wherein the certificate signing request is stored by the control unit at least one of the configuration interface and at the first configuration data server.

12. A method of operating a stationery service center arranged apart from a motor vehicle equipped with a configuration interface for a control unit controlling an infotainment application, and equipped with a first configuration data server separate from the control unit having a corresponding first configuration data bank for vehicle-related storage of configuration data, at least one of a functional scope and basic setting of the infotainment application being changeable by the control unit via the configuration interface, the method comprising the acts of:

modifying configuration data of a second configuration data bank at the service center through a first modification interface using first access rights, the configuration data bank centrally storing configuration data;
modifying configuration data of the second configuration data bank through a second Internet-based modification interface using second access rights differing from the first access rights; and
transmitting signals to effect a change of configuration data of the first configuration data bank in the motor vehicle by use of the configuration data from the second configuration data bank, the change of configuration data of the first configuration data bank effecting a change in the at least one of the functional scope and the basic setting of the infotainment application,
wherein the stationary service center is operated by an original equipment manufacturer (OEM), and further wherein the first modification interface is used for modifications by only the OEM having the first access rights and the second modification interface is used for modification by only at least one non-OEM having the second access rights.

13. A method of operating a motor vehicle equipped with a configuration interface for a control unit controlling an infotainment application and equipped with a first configuration data server separate from the control unit having a corresponding first configuration data bank for vehicle-related storage of configuration data, the method comprising the acts of:

receiving signals from a stationarily arranged remote service center having a second configuration data server and a second configuration data bank for central storage of configuration data, configuration data of the second configuration data bank being modifiable through a first modification interface using first access rights and through a second Internet-based modification interface using second access rights differing from the first access rights;
changing the configuration data of the first configuration data bank by use of the received signals; and
changing at least one of a functional scope and a basic setting of the infotainment application by way of the configuration interface of the control unit by use of the configuration data from the first configuration data bank,
wherein the stationarily arranged remote service center is operated by an original equipment manufacturer (OEM), and further wherein the first modification interface is used for modifications by only the OEM having the first access rights and the second modification interface is used for modification by only at least one non-OEM having the second access rights.

* * * * *